March 14, 1950 — E. HALLDEN — 2,500,177
DRILL CHIP BREAKER
Filed July 21, 1947
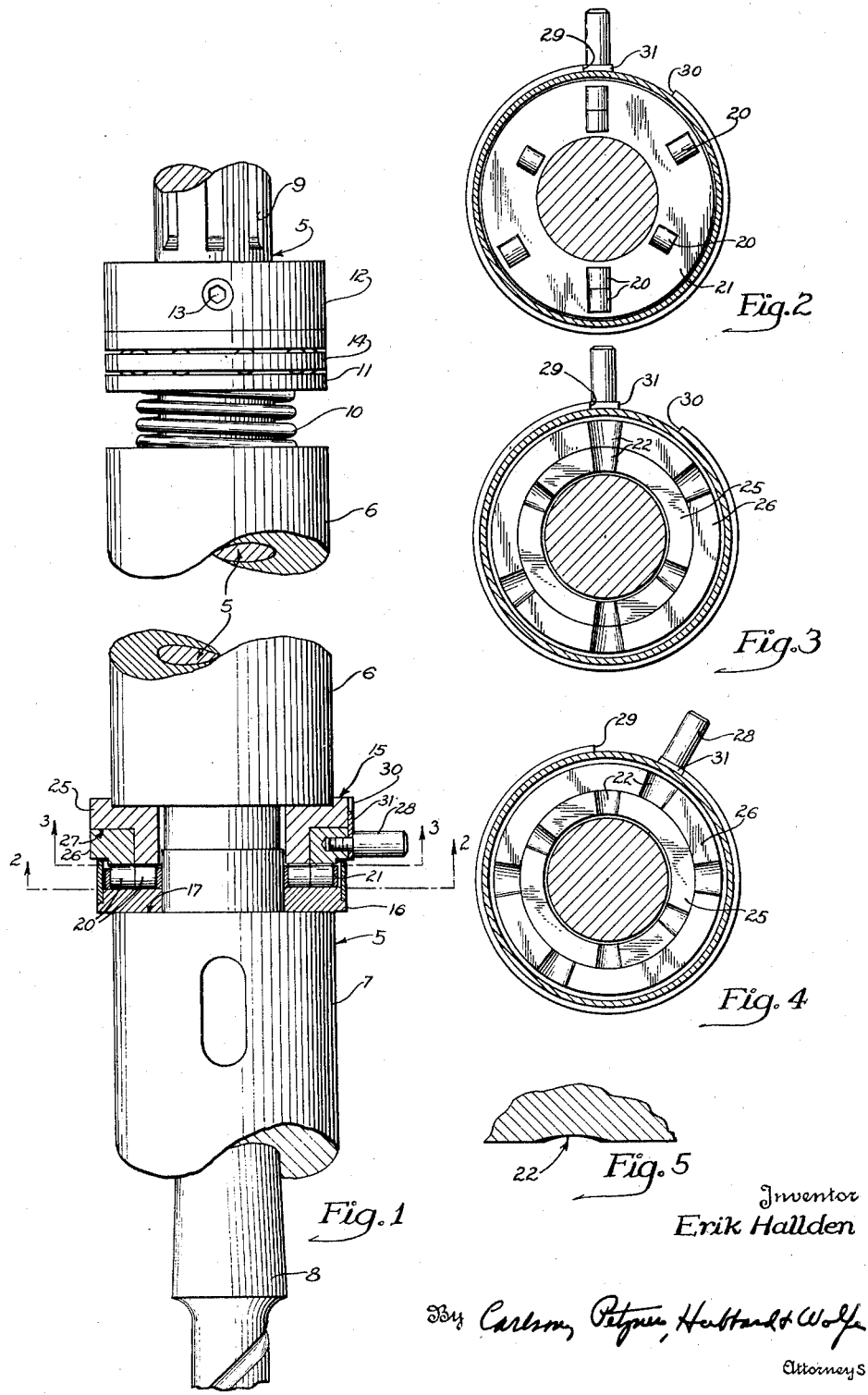
Inventor
Erik Hallden
By Carlson, Pitzner, Hubbard & Wolfe
Attorneys Patented Mar. 14, 1950

2,500,177

UNITED STATES PATENT OFFICE 2,500,177

DRILL CHIP BREAKER

Erik Hallden, Detroit, Mich., assignor to Ex-Cell-O Corporation, Detroit, Mich., a corporation of Michigan Application July 21, 1947, Serial No. 762,267

6 Claims. (Cl. 77—33)

The invention relates generally to drill chip breakers of the type in which the feeding pressure on the drill is periodically relieved to permit the drill to idle or retract for the purpose of severing a previously formed chip curl, and it has particular reference to a chip breaker adapted to be applied directly to the tool supporting spindle of a drilling machine.

One object of the invention is to provide an efficient and reliable drill chip breaker of the above general character which is extremely simple in construction, which has few parts subject to wear and in which internal friction is reduced to a minimum.

Another object is to provide a drill chip breaker which is adapted to sustain the tool supporting spindle against the cutting action of the tool, and which is operative automatically as an incident to the rotation of the spindle to periodically relieve the axial thrust on the spindle.

Still another object is to provide a drill chip breaker which can be rendered active or inactive by simple adjustments, thus making it particularly suitable for incorporation in a drilling machine as a permanent part thereof.

A further object is to provide a drill chip breaker for drilling machines utilizing antifriction bearing elements coacting with bearing members carried respectively by the spindle and its support for sustaining the feeding thrust of the spindle, and having one of the bearing members formed with a series of drop grooves cooperating with the bearing elements to momentarily and periodically relieve the axial thrust on the spindle as an incident to its rotation.

Other objects and advantages of the invention will become apparent from the following detailed description of the preferred embodiment illustrated in the accompanying drawing, in which:

Figure 1 is a fragmentary side view of a drilling machine spindle and support therefor equipped with a drill chip breaker embodying the features of the invention, the chip breaker being sectioned longitudinally of the spindle.

Fig. 2 is a sectional view taken in a plane substantially on the line 2—2 of Fig 1.

Fig. 3 is a sectional view taken in a plane substantially on the line 3—3 of Fig. 1.

Fig. 4 is a sectional view similar to Fig. 3, showing the chip breaker adjusted to an inactive position.

Fig. 5 is a fragmentary sectional view of the upper bearing member showing the form of one of the drop grooves.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

For purposes of illustration, the improved chip breaker has been shown as installed in a drilling machine of the type having a rotatably driven tool supporting spindle 5 journaled in and movable with an axially translatable quill nonrotatable 6. The quill may be supported on the machine frame in any suitable and well known manner, and is adapted to be translated axially by feed mechanism (not shown) to feed the spindle supported tool into and to retract it from the work.

As herein shown, the spindle 5 is adapted to extend through the quill 6, and is provided at its lower end with an enlarged head 7 having a socket for holding a cutting tool, such as a drill 8. The upper end of the spindle is formed with longitudinal splines 9 for connection with the usual driving instrumentalities by which the spindle is rotated.

In accordance with the invention, the improved chip breaker is associated with the spindle 5 and the quill 6 in a manner which enables it to sustain the spindle against the cutting action of the drill as the latter is fed to the work. By reason of its novel construction and its relationship to the elements of the drilling machine, the chip breaker is operative automatically as an incident to the rotation of the spindle alternately to project and relieve the spindle relative to the quill in the direction of the feed. More particularly stated, the arrangement is such that as the tool is rotated and fed to the work by a uniform feeding movement of the quill 6, the chip breaker is operative during a portion of each revolution of the spindle to exert a feeding thrust on the spindle, causing it to advance with the quill. In the succeeding portion of the revolution the feeding thrust is relieved to permit a momentary dwell or to reduce the rate of advance of the spindle sufficiently to cause the tool to sever the chip curls formed by it during the preceding portion of the revolution.

To accommodate its chip breaking action, the spindle 5 is mounted for limited axial movement relative to the quill 6, and means is provided for yieldably holding it in a predetermined position with respect to the quill. The holding means as herein shown comprises a coiled compression spring 10 encircling the spindle 5 and bearing at its lower end against the top of the quill 6. At its upper end the spring 10 bears against a thrust ring 11 which is held against axial movement relative to the spindle by a collar 12 rigidly secured to the spindle as by a locking screw 13. An antifriction end thrust unit 14 is interposed between the ring 11 and the collar 12 to reduce the drag on the ring as the collar rotates with the spindle.

In the exemplary embodiment of the invention, the chip breaker comprises an upper bearing member 15 fixed to and abutting the lower end of the quill 6, and a lower bearing member 16 mounted on and rotatable with the spindle 5. As shown in Fig. 1, the lower bearing member 16 is seated against a shoulder 17 formed by the enlarged head 7 of the spindle. The adjacent axial faces of the members 15 and 16 are shaped to define opposed annular bearing tracks for a series of antifriction bearing elements 20, herein shown as relatively short, cylindrical rollers which serve to transmit the thrust of the quill 6 to the spindle 5.

To provide the intermittent thrust and relief on the spindle 5 for enabling the tool 8 to sever the chip curls formed thereby, the bearing elements 20 are mounted in a cage 21 provided with a series of bearing receiving pockets arranged in predetermined angularly spaced relation and adapted to maintain the elements in a definite, fixed pattern as the cage and elements rotate incident to the rotation of the lower bearing member 16. One of the bearing tracks, in this instance the track provided by the upper bearing member 15, is formed with a series of drop grooves 22 spaced apart similarly to the spacing of the bearing elements. The grooves 22 may be relatively shallow, as for example on the order of 0.013 of an inch in depth, and are formed with their edges substantially radial to the rotative axis of the spindle so that the bearing elements 20 may enter and leave the grooves at the same instant irrespective of their spacing from the axis of the spindle.

As herein shown, the bearing elements 20 and grooves 22 are arranged in a pattern such that all of the elements may register with grooves simultaneously in either of two angular positions of the cage 21 relative to the upper bearing member, said positions being spaced apart 180°. In all other positions of the cage at least one pair and preferably two pairs of the bearing elements will ride on a bearing surface intermediate a pair of grooves and thus sustain the spindle in its normal or projected position with respect to the quill 6.

As the spindle 5 rotates, the bearing elements 20 roll over the bearing tracks and the cage 21 turns at one-half the speed of the spindle. Consequently, the bearing elements register with the grooves once in each revolution of the spindle. As the elements enter the grooves 22, the thrust on the spindle 5 is momentarily relieved allowing the spindle to recede slightly or dwell while the feeding movement of the quill continues. In climbing out of the grooves, the bearing elements act to project the spindle axially relative to the quill until the elements ride on the bearing surfaces intermediate the grooves. Such intermittent relief and projection of the spindle causes the tool 8 to sever the chip curls formed by the tools.

Provision is made for adjusting the chip breaker to an inactive position in which it is ineffective to relieve the spindle in the manner above described in the event that it is desired to operate the drilling machine in a conventional manner. For this purpose, the grooved upper bearing member 15 is constructed so that the spacing or pattern of the grooves 22 may be changed from that of the bearing elements 20 in a manner such that the grooves are not at any time presented for registration simultaneously with all of the bearing elements. Thus, one or more of the bearing elements is or are operative at all times to sustain the thrust of the spindle while their companion bearing elements are in registration with grooves.

In the exemplary chip breaker, the adjustability is obtained by constructing the upper bearing member in two concentrically arranged parts, namely, an inner ring 25 and an outer ring 26. The inner ring is mounted on and secured to the quill 6 in any preferred manner, while the outer ring 26 is seated in a recess 27 formed in the outer marginal edge portion of the ring 25. A radially projecting finger piece 28 is provided on the outer ring 26 for rotating it relative to the inner ring between the active and inactive positions defined by opposed shoulders 29 and 30 formed on the base of the ring 25 and positioned for coaction with a stop finger 31 fixed to and rotatable with the outer ring 26.

To insure a balanced thrust on the spindle 5 the bearings 20 and grooves 22 are arranged in a pattern such that between the relieving actions, the spindle is sustained by at least two bearing elements and preferably by four of the elements disposed on opposite sides of the spindle. The bearing elements 20 are accordingly disposed in two circular groups arranged respectively to travel in paths coincident with the bearing tracks formed by the inner and outer rings 25 and 26 of the bearing member 15. In the particular construction illustrated, four bearing elements 20 are provided in each group. The elements of each group in turn are arranged in pairs spaced apart approximately one hundred and twenty degrees, while the elements of the pairs are spaced apart sixty degrees from each other. The bearing elements of the outer group are similarly spaced, but are offset sixty degrees with respect to the elements of the inner group, as shown in Fig. 2.

The grooves 22 in the rings 25 and 26 are located so that their spacing corresponds exactly with that of the bearing elements when the bearing ring 26 is turned to the active position shown in Fig. 3. Registration of the bearing elements 20 with the grooves may thus take place periodically as the bearing cage rotates relative to the upper bearing member. Such registration occurs only when the bearing elements and grooves are symmetrically alined and the bearing elements thus enter and leave their associated grooves simultaneously. Immediately preceding, during and immediately following such registration, all eight of the bearing elements are in a position to share in the thrust load. This number is momentarily reduced but never less than four bearing elements are in load sustaining position while the companion bearing elements pass over grooves other than the one to which they correspond in the angular pattern.

When the outer bearing ring 26 is turned to the inactive position shown in Fig. 4, the pattern of the grooves is changed so that at least two of the bearing elements are in engagement with a sustaining bearing surface at all times during rotation of the bearing cage. As a result, the spindle is not released but advances uniformly with the quill and the drilling operation is therefore performed in the conventional manner.

It will be apparent from the foregoing that the invention provides a drill chip breaker of novel and advantageous construction. The new and improved bearing arrangement provided by the chip breaker reduces friction to a minimum while operating automatically to intermittently project and relieve the tool so as to break the chip curls formed thereby. The provision for adjusting the chip breaker to an inactive position makes it especially adaptable for installation in a drilling machine as a permanent part thereof, as the machine may thus be used when desired in the conventional way without requiring removal of the chip breaker.

I claim as my invention:

1. The combination with a nonrotatable axially movable quill having a spindle supported therein for rotation and for limited axial movement relative thereto, means yieldably urging the spindle in a direction toward one end of the quill, a thrust bearing limiting the movement of the spindle toward said one end of the quill, said thrust bearing comprising a race ring nonrotatably fixed to the quill, a race ring fixed to and rotatable with the spindle, and a series of antifriction bearing elements non-uniformly spaced apart about the axis of the spindle and interposed between said race rings, one of said race rings having a series of radially disposed shallow grooves in the face engaged by the bearing elements spaced apart similarly to the spacing of the elements for simultaneous registration with the respective elements whereby the thrust on said spindle is periodically relieved incident to the rotation of the spindle.

2. The combination with a nonrotatable axially movable quill having a spindle supported therein for rotation and for limited axial movement relative thereto, means yieldably urging the spindle toward one end of the quill, a thrust bearing limiting the movement of the spindle toward said one end of the quill, said thrust bearing comprising a race ring nonrotatably fixed to the quill, a race ring fixed to and rotatable with the spindle, and a series of antifriction bearing elements interposed between said race rings, a cage operative to retain said bearing elements in fixed nonuniformly spaced relation, one of said race rings having in its bearing engaging face a series of shallow grooves spaced apart similarly to the spacing of said bearing element, said cage rotating relative to said one race ring in response to the rotation of said spindle whereby to periodically aline said bearing elements with said grooves and permit all of the elements to simultaneously enter the grooves and thereby momentarily relieve the axial thrust on the spindle.

3. The combination with a drilling machine spindle axially movable with and rotatable relative to a nonrotatable reciprocatory support, of a chip breaker including a race ring fixed to the support and encircling the spindle, a second race ring mounted on said spindle in opposed relation to said first race ring, said second ring being rotatable with the spindle, a series of antifriction bearing elements interposed between and engaging the adjacent faces of said race rings, a cage adapted to hold said bearing elements in predetermined non-uniformly spaced relation and to rotate relative to the spindle support as said bearing elements roll over said race rings, said first race ring having in its bearing engaging face a series of radially disposed drop grooves spaced apart similarly to the spacing of said bearing elements, said bearing elements being operative to sustain the spindle against the cutting action of the drill imposed by the feed movements of the spindle support when engaging the face of said first race ring and to momentarily relieve the axial thrust on the spindle upon dropping into said grooves, the angular spacing of said grooves and said bearing elements being such that registration therebetween occurs once only in each revolution of the spindle.

4. The combination with a nonrotatable axially movable quill having a spindle supported therein for rotation and for limited axial movement relative thereto, a chip breaker including a pair of annular bearing members mounted on said quill in concentric relation with their axial faces forming coplanar flat bearing surfaces normal to the axis of the spindle, an annular bearing member fixed to and rotatable with said spindle having one axial face defining a flat bearing surface opposed to said first mentioned bearing surfaces, two series of antifriction bearing elements interposed respectively between the bearing face of the member on the quill and the bearing faces of said concentric members, a cage holding the bearing elements of each series in predetermined angularly spaced relation, said concentric bearing members having in their faces radially disposed drop grooves, one of said concentric members being rotatable relative to the other member to a position effective to dispose the grooves in a symmetrical pattern corresponding to the spacing of said bearing elements in said cage whereby to permit all of said elements to register simultaneously with the grooves in the rotation of said cage and thereby momentarily relieve the spindle, said one member when rotated from said position acting to interrupt said relieving action.

5. The combination with a nonrotatable axially movable quill having a spindle supported therein for rotation and for limited axial movement relative thereto, means yieldably urging the spindle toward one end of the quill, a thrust bearing limiting the movement of the spindle toward said one end of the quill, said thrust bearing comprising a member fixed to the spindle presenting an annular bearing surface normal to the axis of the spindle, a pair of concentrically arranged members carried by said quill and jointly presenting an annular bearing surface spaced from and disposed parallel to the bearing surface of said first mentioned member, a series of antifriction bearing elements interposed between said bearing surfaces, a cage operative to retain said bearing elements in predetermined angularly spaced relation, said concentrically arranged members having radially disposed drop grooves in the faces forming said bearing surface, said grooves being spaced apart similarly to the spacing of said bearing elements and adapted to receive the elements in the rotation of said cage whereby to momentarily relieve the spindle, and means for rotating one of said concentric members relative to the other to position said grooves so that a predetermined number of the bearings are effective at all times to sustain the thrust of the spindle while the other bearings are in registration with the grooves.

6. A chip breaker for drill spindles comprising two groups of antifriction bearing elements arranged in concentric series, a cage for holding said elements in predetermined spaced relation, a bearing member providing a flat annular bearing track for one group of elements, a second bearing member providing a flat annular bearing track for the other group of elements, said bearing tracks being concentrically disposed, a third bearing member providing a flat annular bearing track opposed to said concentric tracks and engageable by both groups of elements, the bearing surfaces of said concentric members being interrupted by radially disposed drop grooves, the grooves of each group being spaced apart so that by rotation of one of the concentric members relative to the other they may be positioned to register with all of the bearing elements simultaneously.

ERIK HALLDEN.

REFERENCES CITED

The following references are of record in the file of this patent:

UNITED STATES PATENTS

| Number | Name | Date |
|---|---|---|
| 1,523,629 | Bullock | Jan. 20, 1925 |
| 2,430,019 | Jenkins | Nov. 4, 1947 |